Figure 1:
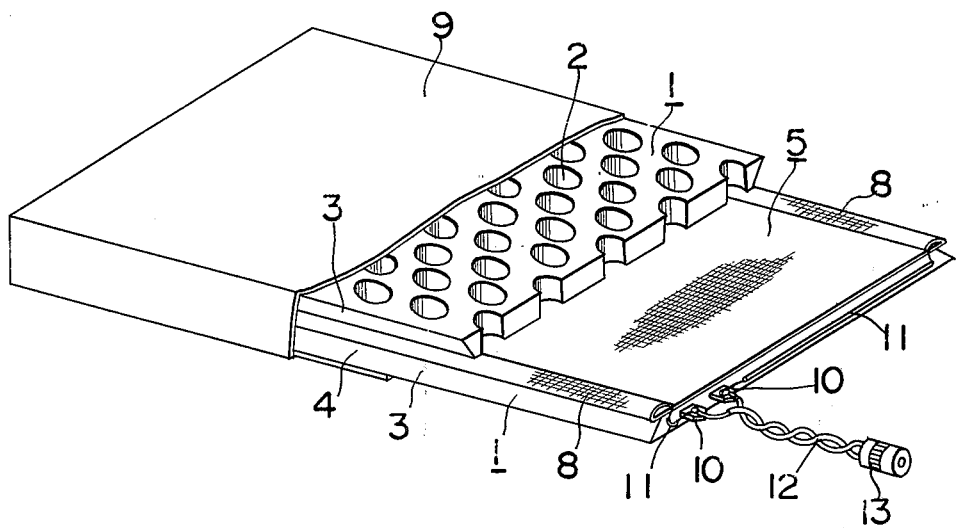

United States Patent [19]
Shimizu et al.

[11] 3,940,592
[45] Feb. 24, 1976

[54] ELECTRICALLY HEATED ALIGNMENT PAD

[75] Inventors: Keiji Shimizu, Tokyo; Hiroshi Yoshida, Musashino; Haruhisa Furuishi, Suita; Yoshihiro Murata, Katano; Hidenori Suzaki, Hirakata; Kuninori Azuma, Ikoma; Kinji Terawaki, Osaka; Hiroshi Izumi, Tokyo, all of Japan

[73] Assignees: Matsushita Electric Industrial Co., Ltd., Kadoma; Japanese National Railways, Tokyo, both of Japan

[22] Filed: Nov. 29, 1973

[21] Appl. No.: 419,968

[30] Foreign Application Priority Data
Dec. 13, 1972 Japan.............................. 47-124278

[52] U.S. Cl................ 219/548; 219/545; 219/547; 338/208
[51] Int. Cl.[2]..................................... H05B 3/10
[58] Field of Search............ 219/200, 201, 544–546, 219/547, 548–549, 528; 338/208, 212; 52/DIG. 7, 309; 264/DIG. 71, 27, DIG. 46

[56] References Cited
UNITED STATES PATENTS

| | | | |
|---|---|---|---|
| 2,467,349 | 4/1949 | VanDaam | 219/545 X |
| 2,662,045 | 12/1953 | Baggott | 264/DIg. 46 |
| 2,669,646 | 2/1954 | Ford | 219/545 X |
| 2,741,692 | 4/1956 | Luke | 219/549 X |
| 2,889,439 | 6/1959 | Musgrave | 219/345 |
| 2,938,992 | 5/1960 | Crump | 219/545 X |
| 3,060,303 | 10/1962 | Skoglund et al. | 219/549 |
| 3,111,569 | 11/1963 | Rubenstein | 52/DIG. 7 |
| 3,527,925 | 9/1970 | Toyooka et al. | 219/545 X |

FOREIGN PATENTS OR APPLICATIONS
1,217,040  12/1970  United Kingdom

*Primary Examiner*—C. L. Albritton
*Attorney, Agent, or Firm*—Wenderoth, Lind & Ponack

[57] ABSTRACT

A pad comprising at least one sheet of material having a thermoplastic resinous composition and a heater actuable to heat and soften the sheet, the pad being for use in alignment of machine equipment, rails, beams, girders, or other constructional elements relative to a horizontal base, vertical or inclined line, or to other constructional elements. In use the pad is placed between the equipment, rail or the like and a support or abutment therefor, and the heater is actuated so as to soften the pad just sufficiently that the weight of object or a force thereon reduces the thickness of the pad an amount equal to the desired movement of the object necessary to achieve the desired alignment.

11 Claims, 8 Drawing Figures

ELECTRICALLY HEATED ALIGNMENT PAD

The present invention relates to an improved alignment means for levelling, aligning or padding beam girders, rails, or other constructional elements, and more particularly to an electrically heated alignment pad comprising one sheet of thermoplastic resin of suitable thickness and an associated electrical heating means, the pad being placed between a base, or other reference support, and a constructional element and, thereafter, the heater being actuated to soften the thermoplastic sheet, whereby pressure from the constructional element compresses the pad, and reduces the thickness thereof, and the constructional element moves into a new alignment. And, when the pad has been compressed to the required thickness for holding the constructional element in the required alignment, the heater is turned off, and the thermoplastic sheet cools and hardens and supports the constructional element at the required alignment.

In the construction of bridges, railroads, or installation of machine it is frequently necessary to ensure that certain constructional elements are at a set level relative to a certain base, or in a set alignment relative to a certain line. Since it is not practically possible to immediately lay a constructional element or machine in a required alignment, the usual procedure is to first install the constructional element or machine at approximately the required alignment, and then carry out finer adjustments. In work such as laying railroad tracks, alignment or levelling must be carried out repeatedly and accurately, and there have accordingly been proposed various methods and means for facilitating this procedure. A conventional method and means has been to provide a bag between a base and an element to be laid level, for example, a rail, and to inject into the bag a certain amount of fluid resin, which subsequently hardens and supports the rail at the required level. Another conventional method has been to hold a rail in a required alignment by certain amounts of concrete poured into various interstices between the rail and base or other supports. These methods have the disadvantages that much time is required, both to effect the injection or pouring, and to wait for concrete to harden, and that it is difficult to calculate the required amounts of resin or concrete to be injected or poured. It has also been known to align or level rails or machines by means of adjustable anchor bolts. But this method also requires considerable time for drying concrete.

It is accordingly an object of the present invention to provide an improved alignment means for use in alignment of machine equipment, rails, beams, girders, or other constructional elements relative to a horizontal base, vertical or inclined line, or to other constructional elements and for padding the space, or the interstice, between a certain element and another element.

It is another object of the invention to provide an alignment means that is easily applied, and lends itself to large-scale alignment operations.

It is a further object of the invention to provide an alignment means that functions rapidly, and brings a required object into a required alignment or to a required level in a short time.

It is yet another object of the invention to provide a levelling means that is cheap and simple in construction and manufacture, and easily mass-produced. It is a still further object of the invention to provide an alignment means that requires a minimum of attendant personnel in alignment operations.

In accomplishing these and other objects, there is provided, according to the present inventiona, a pad, which is a single unit comprising at least one sheet of thermoplastic resin of suitable thickness and an associated electrical heating means. The pad is placed beneath, and supports, or partially supports an object which is to be installed at a particular level, and current is passed through the electrical heating means, which thereupon heats, and softens, or partially melts the sheet of thermoplastic resin. The softened, or partially melted resin offering less resistance to the downward-acting weight of the object to be levelled, the object sinks downwards, and simultaneously compresses the sheet to a certain extent, whereby the sheet is made thinner. When the object to be levelled has been lowered to a required extent, current to the electrical heating means is cut, whereupon the sheet of thermoplastic resin cools, and hardens, the resultant solid sheet being thinner than the original sheet, whereby the object to be levelled is supported by the levelling pad at the required level.

The pad may be similarly employed to align objects to lines other than the horizontal, and one or a plurality of pads may be used, according to requirements. If a plurality of pads is employed, current to the electrical heating means of the different pads may conveniently be supplied from a single source. It is not essential for there to be one electrical heating means for each thermoplastic resin sheet. For example, a pad may comprise two heaters, one on either side of a single thermoplastic resin sheet, or a single heater sandwiched between two resin sheets, or three or more resin sheets alternated with heaters.

The resin sheet is preferably shaped or formed in a manner facilitating the alteration in the thickness thereof under the combined effect of heat from an electrical heater and pressure of an object to be levelled or aligned. The surface of a resin sheet in contact with a heater may, for example, be undulatory in form, in which case the protuberating portions of the sheet surface are easily compressed. However, the inventors have found that the most satisfactory manner of facilitating alteration of the thickness of a thermoplastic resin sheet is to provide a sheet with a porous or cellular structure, as produced, for example, by incorporating a volatile agent in a plastic powder which is subsequently sintered, or by thermal decomposition of a blowing agent added to a plastic composition. Alteration of the thickness of a thermoplastic resin sheet is also facilitated by molding a sheet which contains a plurality of holes. In any of these cases, when the sheet is softened, or partially melted, and compressed, various portions within the sheet may expand laterally into the cavities contained in the sheet. The proportion of the total volume of such cavities to the total volume of a sheet is generally determined on the basis of the required eventual decrease in the thickness of the sheet. For example, if it is estimated that a sheet with an original thickness of 10 mm will be required to be reduced to a thickness of about 6 mm at the conclusion of a levelling or other alignment operation, the percentage of cavities to total volume of the sheet is advantageously made 40 %. The provision of cavities in resin sheets employed in alignment pads also has the advantage that a compressed pad still possesses a good finish.

Externally, thermoplastic resin sheets may be plain rectangular sheets. It is sometimes advantageous, however, to provide sheets having bevelled edges, and to assemble sheets in pairs in which the bevelled edges meet to form a V, thereby presenting certain advantages of assembly together with a heater, and also further providing for lateral expansion of a pad. Needless to say, in addition to thermoplasticity, resin sheets are required to have various characteristics, according to the intended use. For example, in laying rails, the thermoplastic resin sheets of the alignment pads would also be required to have good weatherability, good resistance to chemical attack or to attack by heat, water, or oil and also, from considerations of vibration and noise, would be required to possess a certain degree of elasticity.

The heating means associated with the alignment pad of the invention may be simply in the form of an electrical surface heater in contact with the surface of a thermoplastic resin sheet. From consideration of economy, however, the heater is preferably contained in the interior of an alignment pad, for example, between two thermoplastic sheets. The heater in this case is advantageously given a porous structure, to permit melted portions of the thermoplastic sheets to pass through the heater and fuse together, whereby, on subsequent cooling and hardening, the termoplastic sheets form a unitary block, providing a solid support. While various types of heaters may be successfully employed in the alignment pad of the invention, the most satisfactory type of heater has been found to be a woven heater, comprising a woven glass-fibre mat and electrically conductive wire coiled or wound therein to form a heat-emissive surface. The winding pitch of the electrical wire should be small enough to ensure even softening, or melting, of thermoplastic sheets in contact with the heater, but, of course, not so small that there is a risk of short circuit between different turns of the wire. For example, using copper wire 0.18 mm, the wire is suitably wound with a density of 15–30 coils per inch. Also, since the heating effect is greater in the center of the pad, it is advantageous to increase the winding density of the heating wire near the periphery of the pad, to effect even heating over the whole surface of the heater. Also, in locations where an alignment pad may come into contact with metallic objects, the pad may be provided with an insulating case, to prevent lowering of heater efficiency due to transfer of heat therefrom to the metallic objects. Such an insulating case is of particular effect in an alignment pad comprising a heater sandwiched between two thermoplastic sheets.

Figure 2:
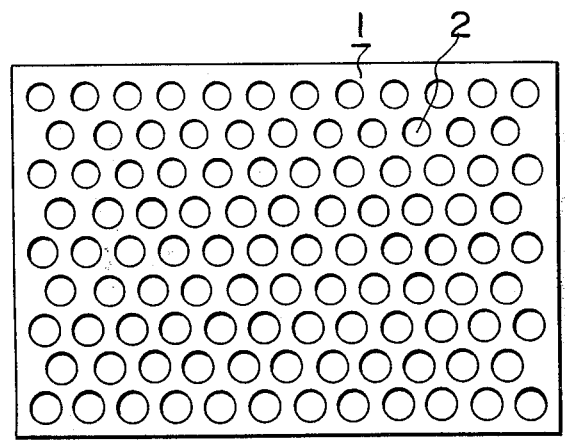
Figure 3:
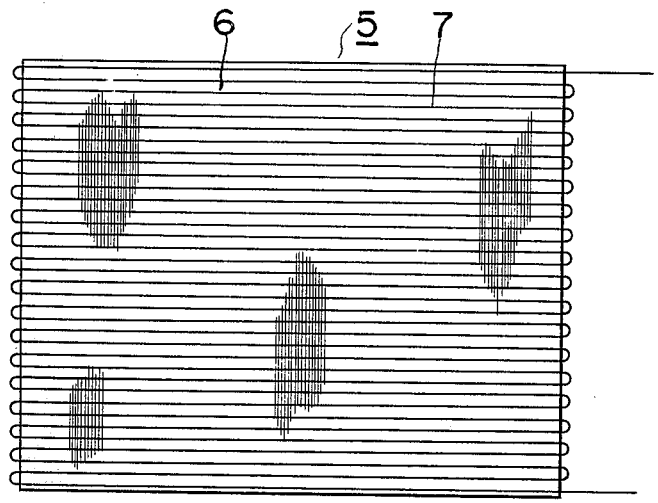
Figure 4:
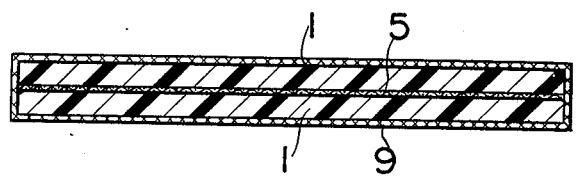
Figure 5:
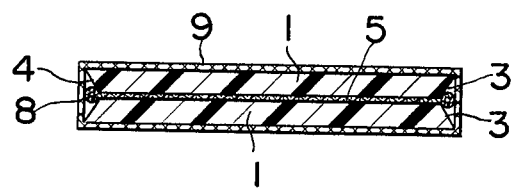
Figure 6:
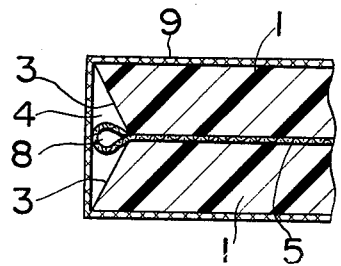
Figure 7:
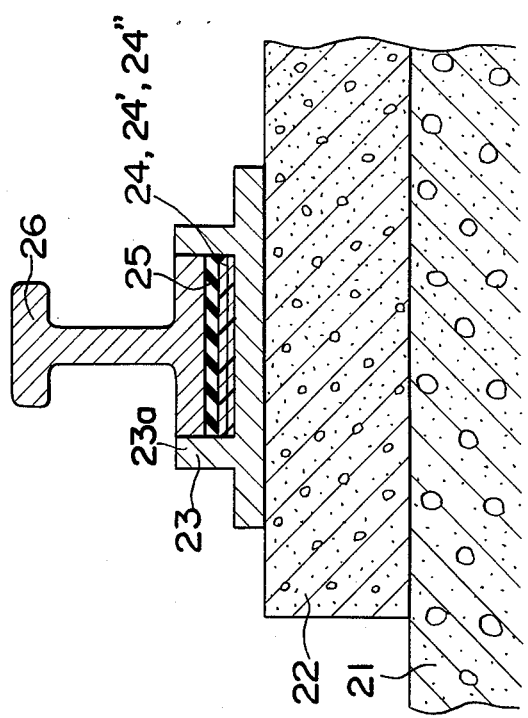
Figure 8:
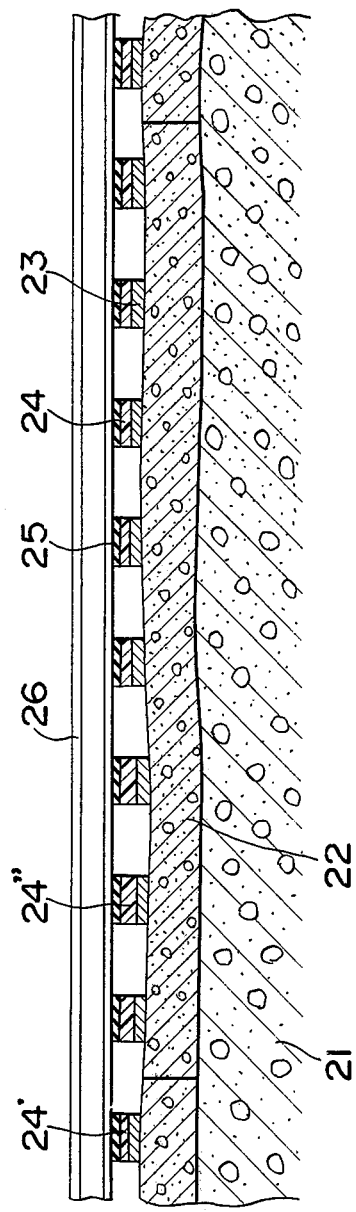

These and other objects and features of the present invention will become apparent from the following description taken by way of example with reference to the accompanying drawings, in which;

FIG. 1 is a perspective view, partially in section, of an electrically heated alignment pad according to one embodiment of the invention, in an assembled condition, FIG. 2 is a plan view of a thermoplastic resin sheet employed in the alignment pad of FIG. 1, FIG. 3 is a plan view of a heater employed in the alignment pad of FIG. 1, FIG. 4 is a cross-sectional view taken along the longitudinal axis of the alignment pad of FIG. 1, FIG. 5 is a cross-sectional view taken along the transverse axis of the alignment pad of FIG. 1, FIG. 6 is a cross-sectional view, on an enlarged scale, of a side portion of the alignment pad of FIG. 5, FIG. 7 is a cross-sectional view taken along a transverse axis and illustrating the employment of the alignment pad of FIG. 1 for laying a railroad rail, and FIG. 8 is a cross-sectional view taken along a longitudinal axis and illustrating the employment of a plurality of alignment pads of FIG. 1 for laying a rail, or rails.

Before the description of the present invention proceeds, it is to be noted that like parts are designated by like reference numerals throughout the accompanying drawings.

Referring initially to FIG. 1, there is shown an alignment pad 24, which is preferably employed in the laying of railroad rails, and which comprises a woven heater 5 sandwiched between two sheets of thermoplastic resin 1, and a cover 9 made of an insulating sheet-like material, and enclosing the thermoplastic sheets 1 and heater 5.

In consideration of the purpose for which the pad 24 is utilized, desirable characteristics of the material for the thermoplastic sheets 1 are (a) easy formability under pressure, when heated to 100°–300°C, (b) sufficient elasticity to absorb vibrations produced by trains passing above the pad, (c) good creep properties, and low compressibility when solidified (d) good resistance to physical change in ambient conditions, and over a temperature range of −40°-(+)80°C. Material meeting these requirements is, for example, a polyester plastic manufactured by Toyo Boseki Kabushiki Kaisha (trading under name of Toyobo Co., Ltd.) of Osaka, Japan and available under the trademark "Pelprene".

Referring now to FIGS. 1 and 2, each sheet 1 constitutes a flat rectangular sheet which is 185 mm long, 125 mm wide, and 5 mm thick. Approximately 40 % of the surface area of each sheet 1 is constituted by round holes 2, which pass completely through the sheet 1, and which each have a diameter of 10 mm.

As shown in FIGS. 1 and 5, the long sides 3 of each sheet 1 are bevelled. The sheets 1 are laid on one another in such a manner that the bevelled sides 3 thereof are inclined in opposite directions, and together constitute V-shaped notch portions 4 on opposite sides of the assembled pad 24.

The woven heater 5 sandwiched between the sheets 1 is shown in FIGS. 1 and 3. The heater 5 comprises a thin fibre-glass mat 6 and a continuous heating element 7, which is woven into the mat 6 and follows a coiled path therein. The heating element 7 employed is a copper wire having a diameter of 0.18 mm, and the coil density thereof is 15–30 per inch of the mat 6, that is, each coil section is separated from the next by 1/15–1/30 of an inch. The opposite ends of the heating element 7 are brought out on the same side of the pad 6, which is a short side thereof. The heater 5 is equal in length to, but several millimeters wider than the sheets 1, 1. The short sides of the heater 5 may therefore be aligned exactly with the short sides of the sheets 1, but the heater 5 projects a little beyond each long side of the sheets 1. These projecting portions along the long sides of the heater 5 are bound with insulating tape, then rolled inwards, and bonded in this rolled condition to form roll-back portions 8 which are accommodated in the notch portions 4, as shown most clearly in FIG. 6. These roll-back portions 8 increase the effectiveness of the heating element 7 along the sides of the pad 24, and compensate for the fact that heating is generally greater in the center of the pad 24. Therefore, when current is passed through the heating element 7, the meeting surfaces of the sheets 1 are heated evenly.

As shown in FIG. 1, the free end portions of the heating element 7 are contained and guided in insulation tubes 11, and brought to terminals 10 which are partially embedded in, and project from a short side of the sheets 1. Opposite ends of the heater element 7 are connected to different terminals 10. The terminals 10 are also connected by external leads 12 to a jack 13, which may be plugged into a suitable conventional power supply.

Still referring to FIG. 1, the sheets 1 and heater 5 assembly is covered by a sheet-like, heat insulation material 9, which is 0.1–0.2 mm thick, and is made of unwoven polyester resin.

FIGS. 7 and 8 illustrate the utilization of the above-described pad 24 in the laying of railroad track. In the drawings, there is shown a track base 21 which supports concrete slabs 22. Each concrete slab 22 is approximately 5 mm long and is aligned with the longitudinal axis of rails to be laid. Tie plates 23 are fixedly mounted on the concrete slabs 22, at intevals of about 0.6 m. The tie plates 23 comprise upwardly projecting portions 23a which receive the lower portion of a rail 26 to be laid. At the base of the upwardly projecting portion 23a of each tie plate 23 there is placed an alignment pad 24, and above the alignment pad 24 there is placed a block of rubber 25. The purpose of the rubber blocks 25 is to absorb vibrations produced by trains subsequently travelling on the rail 26 to be laid. The thickness of the rubber blocks 25 remains unchanged throughout the track-laying operation.

Next, the rail 26 is lowered into the upwardly projecting portions 23a of the tie plates 23, and onto the rubber blocks 25 and pads 24. At the same time, the jacks 13 of the pads 24 are connected to a power source in a known manner, and current is supplied through the external leads 12 to the heaters 5 of the pads 24, whereby the thermoplastic sheets 1 of the pads 24 are heated and softened, or partially melted, and the pads 24 lose sufficient solidity to support the weight of the rail 26, and may be compressed by the rail 26. The rail 26 is allowed to move downwards under its own weight, compressing the pads 24, until it settles at the required level, at which point the current to the heaters 5 is cut. Hereupon, the sheets 1 cool and harden, and the pads 24 acquire sufficient solidity to support the rail 26. All other supports for lowering or holding the rail 26 may therefore now be removed, and the rail 26 remains supported at the required level by the pads 24.

With respect to the abovedescribed procedure, it is to be noted that the cooling and hardening time of the thermoplastic sheets 1 is extremely short, being only about few minutes and, in general, electric current to the heaters 5 may be cut simultaneously when the rail 26 reaching the required level. Also, any unevenness in the track base 21 or concrete slabs 22 is automatically compensated by the pads 24. In addition to the abovedescribed procedure, it may be, at will, possible to employ not only a means for detecting and securing the required level such as a level gauge, a member positioned on the required level, or the like, but also a means for facilitating the downward movement of the rail such as a jack, a press, or the like, in a known manner according to the condition to be aligned.

As is well known, it is technically impossible, or prohibitive in terms of cost and time, to form a track base or concrete slabs exactly on a required level over a considerable distance, and it is common experience that some portions of track base or concrete slabs are higher than others. Conventionally, this unevenness of a track base or concrete slabs has presented a further problem in the laying of railroad track. With the means of the invention, however, this problem is automatically eliminated, since pads 24 are compressed different amounts according to their positions relative to a base line. For example, in FIG. 8, if a pad 24' is on a higher portion of a concrete slab 22 than another pad 24", when the rail 26 is lowered onto the pads 24, and current is supplied to the heaters 5, the higher pad 24' is compressed more than the lower pad 24". Upon subsequent cooling and hardening of the pads 24, the lower pad 24" is thicker than the higher pad 24'. The same principle applies to other pads 24 on other portions of concrete slabs 22. That is, after solidification of the sheets 1, the pads 24 may have different thicknesses, but the top surfaces of the pads 24 are all level, whereby support for the rail 26 is even and level.

The rail 26 may be lowered straight onto the pads 24, or may be temporarily supported at opposite ends by alignment support means in a conventionally known manner. Also according to the requirements of different situations, actuating and stopping of heating of the pads 24 may be effected by an operator, or may be effected by time switches. Also, of course, the pads 24 function in exactly the same manner, if the concrete slabs 22 are replaced by another support, such as wooden sleepers spaced at intervals of several tens of centimeters.

In all the above-mentioned cases, it is to be noted that the initial placement of the alignment pads of the invention may be effected rapidly and efficiently, and does not required skilled personnel, adjustments requiring the attention of personnel are minimum, the time required for a rail to be set at a required level is very short, and also the material required for levelling, that is, the pads themselves, is easy and economical to produce.

From the foregoing, it is believed that the objects, advantages, construction and operation of the present invention will be readily comprehended by persons skilled in the art, without further description. Although the invention has been herein shown and described as applied to the laying of railroad track, by way of example, it will be appreciated that the invention is applicable to various other purposes, including the mounting, levelling, or alignment of machines, beams, girders, or other items of equipment or construction. It will also be appreciated that certain parts or elements disclosed herein are representative of other parts or elements which may be used in the same or a similar manner to accomplish the same or similar results. The scope of the present invention should therefore be determined from the following claims.

What is claimed is:

1. An electrically heated aligment pad which comprises at least one plate member of thermoplastic resin and at least one thin flat electric heater lying against said plate member for heating said plate member to soften said plate member, said plate member having a large plurality of apertures therein spread substantially uniformly over the whole area of said plate member and into which portions of said plate member around said apertures flow laterally when said plate member is in the heat softened condition and an external compression force is applied thereto for reducing the thickness of said plate, whereby an object through which the compression force is applied can be moved by the reduction of thickness of the alignment pad for adjusting the position thereof in the direction of the force being applied to the alignment pad.

2. An electrically heated alignment pad as defined in claim 1, further comprising a heat insulation means on at least two sides of said plate member and heater.

3. An electrically heated alignment pad as defined in claim 1, wherein said apertures are in the form of holes extending completely through the thickness of said plate member.

4. An electrically heated alignment pad according to claim 1, wherein each of said apertures is a recess on one surface of said plate member.

5. An electrically heated alignment pad as defined in claim 1, wherein said pad comprises a plurality of plate members, and a heater interposed between each pair of adjacent plate members, each said heater being a surface heater.

6. An electrically heated alignment pad according to claim 1, wherein said plate member has an outer peripheral edge, the thickness of said plate at said outer peripheral edge being less than that of the remaining portion of said plate member.

7. An electrically heated alignment pad according to claim 1 wherein said heater comprises means at the peripheral edge of said pad for generating a greater amount of heat, when energized, than the remainder of said pad generates at the portion thereof corresponding to the remainder of said plate member.

8. An electrically heated alignment pad as defined in claim 5, wherein said surface heater is a woven heater which comprises a woven mat having a metallic heating element woven thereinto.

9. An electrically heated alignment pad which comprises a plurality of plate members of thermoplastic resin, each of said plate members having a plurality of openings therein each of which openings extends completely through the thickness of said plate member, and a plurality of surface heaters, one between each two adjacent plate members, each of said heaters being a woven mat having a metallic heating element woven therethrough, said heaters, when energized, heating said plate members to soften the latter so that the thickness of said pad is reduced when an external compression force is applied thereto, whereby an object through which the compression force is applied can be moved by the reduction of thickness of the alignment pad for adjusting the position thereof in the direction of the force being applied to the alignment pad.

10. An electrically heated alignment pad which comprises; a pair of plate members of thermoplastic resin, each of said plate members having a plurality of holes each extending completely through the thickness of said plate member; a planar heater comprised of a woven mat having a continuous metallic heating element woven therethrough in a substantially zigzag manner, said planar heater being held in position between said plate members and adapted to, when energized, heat said plate members to soften the latter so that the thickness of said pad is reduced when an external compression force is applied thereto, whereby an object through which the compression force is applied can be moved by the reduction of thickness of the alignment pad for adjusting the position thereof in the direction of the force being applied to the alignment pad; a covering of electrically insulating material enclosing the assembled plate members and planar heaters; and said heating element having both encs extending outwardly through said covering and having terminal members thereon for electrical connection with an electric power source.

11. An alignment pad according to claim 10, wherein said plate members are bonded to each other through interstices in said mat and said heating element of said planar heater.

* * * * *